United States Patent [19]
Buschini et al.

[11] 3,962,811
[45] June 15, 1976

[54] CHAIN COMPONENT

[75] Inventors: Anthony Alan Buschini, Fleetwood; Douglas Edward Swarsbrick, Stourport-on-Severn, both of England

[73] Assignee: Parsons Controls Limited, Stourport-on-Severn, England

[22] Filed: Aug. 19, 1974

[21] Appl. No.: 498,780

[30] Foreign Application Priority Data
Aug. 24, 1973 United Kingdom............... 40209/73

[52] U.S. Cl............................................. 43/8; 59/86
[51] Int. Cl.²...................................... A01K 73/02
[58] Field of Search ............... 59/86; 43/8, 9, 43.13

[56] References Cited
UNITED STATES PATENTS

| | | | |
|---|---|---|---|
| 1,222,997 | 4/1917 | Rottmer.................................. | 59/86 |
| 2,363,668 | 11/1944 | Groen................................ | 43/43.13 |
| 2,369,344 | 2/1945 | Ehmann................................ | 59/86 |
| 3,319,990 | 5/1967 | Beal........................................ | 59/86 |
| 3,656,293 | 4/1972 | Lowery, Sr. ............................ | 59/86 |
| 3,817,028 | 6/1974 | Blackwood ............................. | 59/86 |
| R25,165 | 5/1962 | Pulsifier.............................. | 43/43.13 |

Primary Examiner—Warner H. Camp
Attorney, Agent, or Firm—Baldwin, Wight & Brown

[57] ABSTRACT

A shackle component for use in a fishing trawl in the form of a pair of shackles or clevises arranged in back-to-back relationship with the free ends of the arms of each extending away from each other, each of the arms of each shackle being apertured to receive a connecting pin and at least one of the arms of each shackle having a further aperture therein to receive a locking pin to hold the connecting pin in place.

2 Claims, 1 Drawing Figure

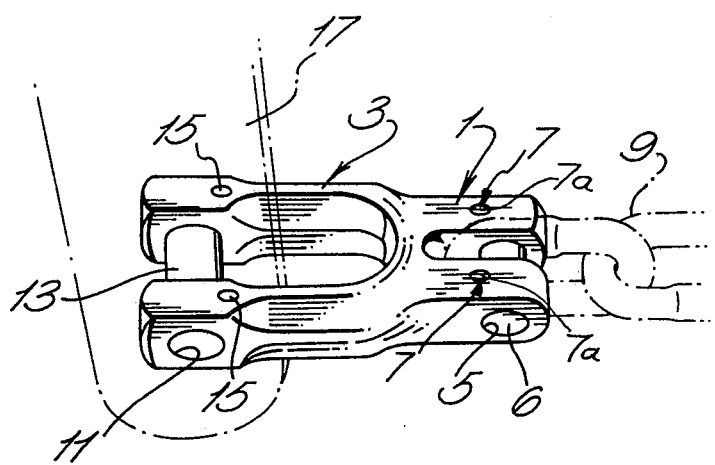

CHAIN COMPONENT

This invention relates to a component for use with chain and in particular to a component designed specifically for use with chain used in a fishing trawl.

In the past, the deep sea trawling industry has had to rely upon mild steel fittings which are of uncertain strength, and wire rope for its trawls. We have now found that by using heat treated alloy steel instead of mild steel, a much stronger and more reliable trawl results. During the design of the various components, care had to be taken to make the various components as versatile as possible so that they were capable of various uses in different positions in all methods of and variations in deep water trawling.

We have found that by using a heat treated alloy steel, preferably nickel chromium molybdenum alloy steel, and fully heat treating the alloy, the components can be made extremely wear resistant and have a Brinell hardness in the range of 380 – 410. This wear resistance means that the life expectancy of our components and the chain itself should be in the order of 10:1 compared with components made of conventional mild steel. Furthermore, because of the quality of the steel alloy, it has been possible to design components and chains which, as well as having high strength, are of light weight and are easy to handle. This has the advantage of reducing crew fatigue and in certain instances of reducing man power.

According to the present invention we provide a clevis or shackle component for use in a fishing trawl, comprising two clevises arranged in back to back relationship with the free ends of the arms of each clevis extending away from each other and wherein a connecting pin and at least one locking pin for the connecting pin are provided for each clevis, each of the arms of each clevis being apertured to receive the connecting pin and at least one of the arms of each clevis being apertured to receive the locking pin.

Preferably, one of the clevises has longer arms than the other for connection, for example, to a plate-like member, a spliced loop on the end of a wire rope or a U-shaped member which is attached to a trawl door, whereas the other clevis is adapted for connection to an end link of a chain. Preferably, said one clevis is wider than the other, and the two clevises lie in the same plane.

Preferably, one or both of the clevises is provided with oval apertures to receive an oval connecting pin and each locking pin locates in a tangential groove in each oval locking pin.

Preferably, the clevis is formed of nickel chromium molybdenum alloy steel having a Brinell hardness in the range of 380 to 410.

Also according to the present invention, we provide trawling gear which incorporates at least one clevis trawl component as hereinbefore described.

A preferred embodiment of clevis in accordance with the invention is now described with reference to the accompanying drawing which is a perspective view.

Referring to the drawing, the shackle component is comprised of a pair of clevises 1 and 3 arranged in back-to-back relationship, the clevis 1 being similar to a standard clevis or shackle and having a pair of parallel arms formed with aligned main apertures 5 of oval shape to receive an oval connecting or coupling pin 6 which spans the space between the clevis arms. A circular aperture 7 is provided in each of the arms to extend transversely to and tangentially intersect with the associated oval main aperture 5 to receive a locking pin 7a which engages in a tangential groove in the coupling pin 6 to hold it in place. Normally, the clevis 3 is connected to the end link of a chain 9.

The clevis 3 is slightly larger throughout than the clevis 1 and in particular the two arms of the U are longer than those of the clevis 1. In this case, however, the arms instead of being of substantially square cross-section throughout, are more in the shape of a rhombus although the ends are of square cross-section and each is provided with an oval main aperture 11 to receive an oval coupling or connecting pin 13 which is again held in position by a pair of locking pins 15 passing through other apertures in the arms extending at right angles to the apertures 11 and engaging in tangential grooves in the pin 13. Because of the increased length of the arms of the clevis 3, the clevis 3 is particularly versatile and can be used for connection to a plate member such as the plate member 17 shown in the drawing or to other trawl components, e.g. wire rope, chain, shackles or the like.

Although the clevis 3 is slightly wider than the clevis 1 of the component, the component is nevertheless made narrow at its largest end and of a generally rectangular cross-section so that it can pass through another trawl component known as a Kelly's Eye. Such a component is the subject of our co-pending application for U.S. Pat. Ser. No. 498,765 filed Aug. 19, 1974.

What is claimed is:

1. A shackle component for use in a fishing trawl comprising two clevises arranged in back-to-back relationship with the free ends of the arms of each clevis extending away from the free ends of the arms of the other clevis, the arms of one of said clevises being longer than the arms of the other of said clevises and said one of said clevises being wider than said other of said clevises, both of said clevises lying in the same plane, aligned main apertures of oval shape being formed in the arms of each clevis and other apertures being formed in at least one of the arms of each clevis to extend transversely to and intersect the main aperture in the associated arm, oval connecting pins respectively in the main apertures in each of said clevises and spanning the space between the associated clevis arms, each of said connecting pins having a tangential groove in the part thereof located within one of said main apertures, and locking pins respectively in said other apertures engaging the tangential grooves in said connecting pins in the respectively associated main apertures.

2. Trawling gear incorporating at least one shackle component as claimed in claim 1 further including a chain having a link positioned between the arms of the clevis having the shorter arms and through which link the associated connecting pin extends, and a plate member positioned between the arms of the clevis having the longer arms and through which plate member the associated connecting pin extends.

* * * * *